(12) United States Patent
Okkel et al.

(10) Patent No.: US 12,024,471 B2
(45) Date of Patent: Jul. 2, 2024

(54) CERAMIC SLURRY COMPOSITION AND PROCESS FOR PRODUCING STACKED CERAMIC COMPONENT

(71) Applicant: BYK-Chemie GmbH, Wesel (DE)

(72) Inventors: Andreas Okkel, Wesel (DE); Guillaume Wojciech Jaunky, Wesel (DE); Yoshito Kitagawa, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 513 days.

(21) Appl. No.: 17/286,849

(22) PCT Filed: Oct. 25, 2019

(86) PCT No.: PCT/EP2019/079298
§ 371 (c)(1),
(2) Date: Apr. 20, 2021

(87) PCT Pub. No.: WO2020/089126
PCT Pub. Date: May 7, 2020

(65) Prior Publication Data
US 2021/0380491 A1 Dec. 9, 2021

(30) Foreign Application Priority Data
Oct. 30, 2018 (EP) ..................................... 18203544

(51) Int. Cl.
*C04B 35/626* (2006.01)
*C04B 35/468* (2006.01)
(Continued)

(52) U.S. Cl.
CPC ........ *C04B 35/6264* (2013.01); *C04B 35/468* (2013.01); *C04B 35/62218* (2013.01);
(Continued)

(58) Field of Classification Search
CPC ............ B32B 18/00; C04B 2235/3234; C04B 2235/6027; C04B 2235/606;
(Continued)

(56) References Cited

U.S. PATENT DOCUMENTS 8,367,762 B2 2/2013 Jaunky et al.
9,259,700 B2 2/2016 Fischer et al.
(Continued)

FOREIGN PATENT DOCUMENTS

EP 2328979 B1 6/2011
EP 2367865 B1 9/2011
(Continued)

OTHER PUBLICATIONS

International Search Report and Written Opinion, International Patent Application No. PCT/EP2019/079298, dated Dec. 20, 2019, 12 pages.

*Primary Examiner* — Philip C Tucker
*Assistant Examiner* — Brian R Slawski
(74) *Attorney, Agent, or Firm* — Fitch, Even, Tabin & Flannery LLP

(57) ABSTRACT

The invention relates to A slurry composition, comprising: an inorganic powder; a dispersant; and a solvent wherein the dispersant is a block copolymer comprising at least one hydrophobic block A and at least one hydrophilic block B, and wherein the blocks A and B comprise repeating units represented by the following general formula (I) wherein $R^1$ is selected from a hydrogen atom, a linear or branched alkyl group having 1 to 10 carbon atoms and a cyclic alkyl group having 4 to 6 carbon atoms, and wherein at least one carboxylic acid group or a salt thereof is covalently linked to the block copolymer.

(Continued)

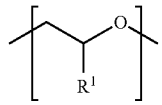

(I)

20 Claims, 3 Drawing Sheets

(51) Int. Cl.
| | | |
|---|---|---|
| *C04B 35/622* | (2006.01) | |
| *C04B 35/634* | (2006.01) | |
| *C04B 37/00* | (2006.01) | |
| *H01G 4/008* | (2006.01) | |
| *H01G 4/12* | (2006.01) | |
| *H01G 4/30* | (2006.01) | |

(52) U.S. Cl.
CPC .. *C04B 35/62655* (2013.01); *C04B 35/63488* (2013.01); *C04B 37/001* (2013.01); *H01G 4/0085* (2013.01); *H01G 4/1227* (2013.01); *H01G 4/30* (2013.01); *C04B 2235/3234* (2013.01); *C04B 2235/6027* (2013.01); *C04B 2235/606* (2013.01); *C04B 2237/346* (2013.01)

(58) Field of Classification Search
CPC ............ C04B 2237/346; C04B 35/468; C04B 35/62218; C04B 35/6264; C04B 35/62655; C04B 35/63488; C04B 7/001; C04B 2235/3236; C04B 2235/6025; H01G 4/0085; H01G 4/12; H01G 4/1227; H01G 4/30; Y02E 60/10
USPC ... 156/60, 89.11, 89.12, 89.14, 89.16, 89.17, 156/230, 235, 242, 244.11, 246, 247, 249; 252/500, 363.5; 501/137; 106/311; 361/321.4
See application file for complete search history.

(56) References Cited

U.S. PATENT DOCUMENTS

| | | |
|---|---|---|
| 9,573,103 B2 | 2/2017 | Gobelt et al. |
| 2004/0106510 A1 | 6/2004 | Kim et al. |
| 2007/0012899 A1 | 1/2007 | Lee et al. |
| 2010/0263575 A1 | 10/2010 | Thetford |
| 2014/0264188 A1* | 9/2014 | Park .................. H01B 1/24 |
| | | 252/514 |
| 2016/0053039 A1* | 2/2016 | Mikayama ............... H01G 4/12 |
| | | 501/137 |
| 2018/0269000 A1* | 9/2018 | Tanaka ................. H01G 4/1236 |

FOREIGN PATENT DOCUMENTS

| | | |
|---|---|---|
| EP | 2723788 B1 | 4/2014 |
| JP | 2002321981 A | 11/2002 |
| JP | 2004160773 | 6/2004 |
| JP | 2004197071 | 7/2004 |
| JP | 2008029901 | 2/2008 |
| JP | 2010119930 | 6/2010 |
| JP | 2013056783 A | 3/2013 |
| WO | 2018139405 | 8/2018 |

\* cited by examiner

[Figure 1]
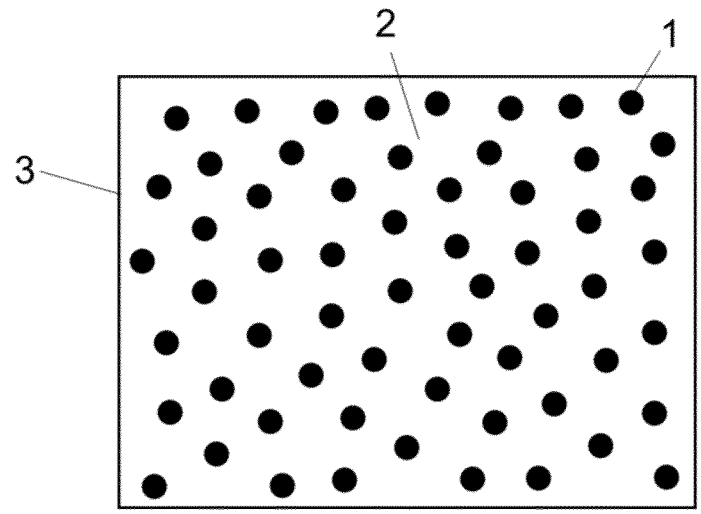
(a)
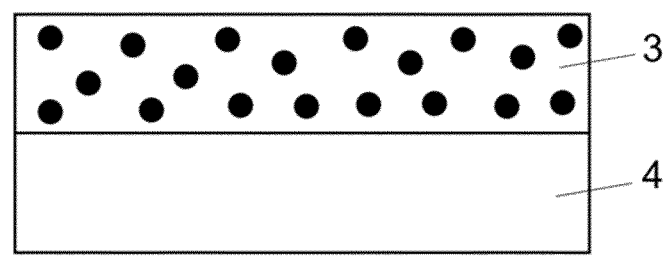
(b)
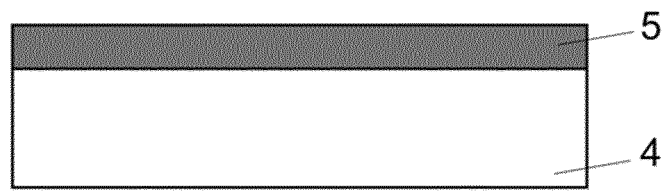
(c)

[Figure 2]
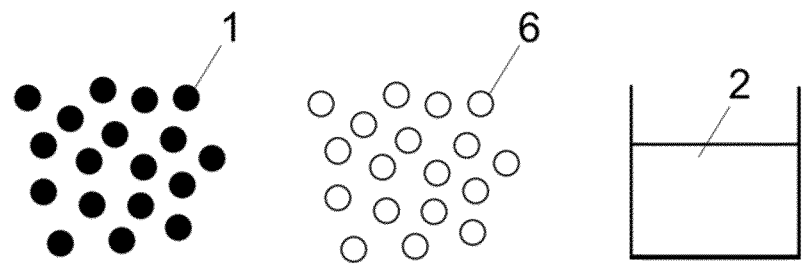
(a)
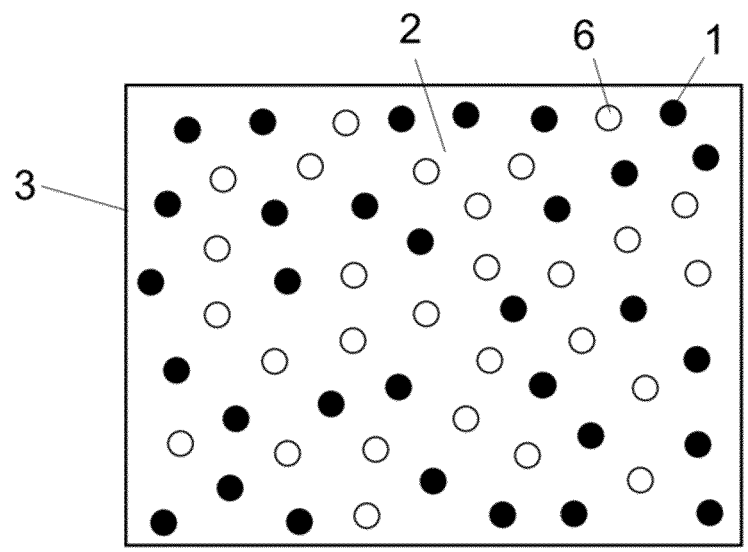
(b)

[Figure 3]
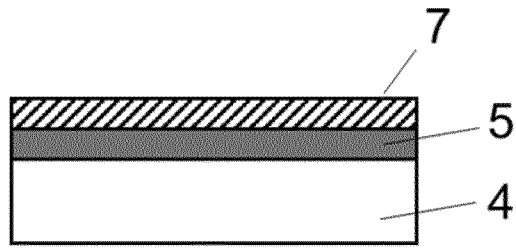
(a)
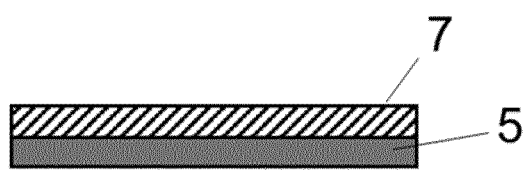
(b)
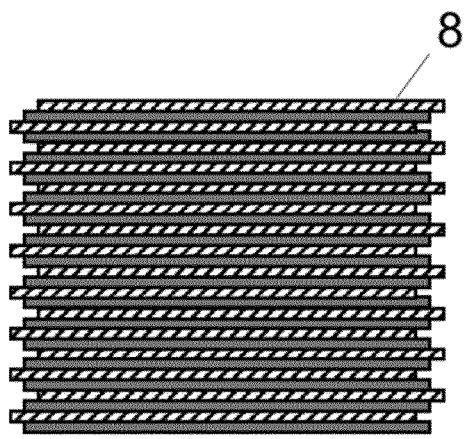
(c)
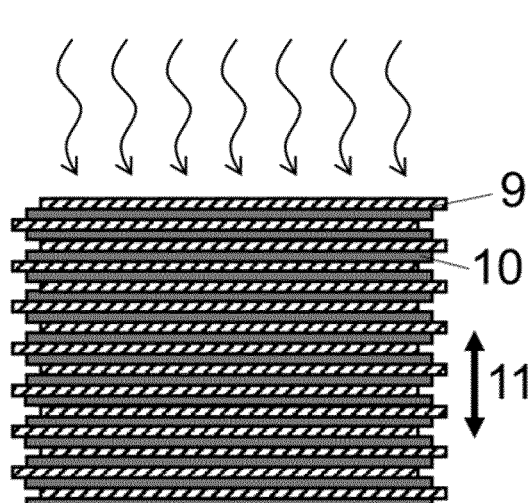
(d)
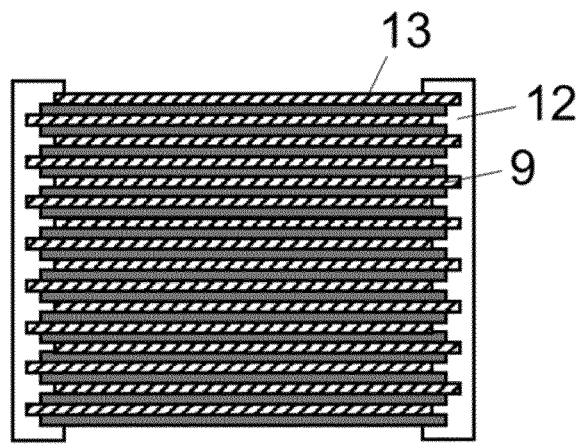
(e)
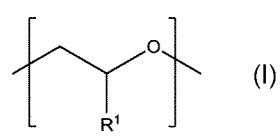

CERAMIC SLURRY COMPOSITION AND PROCESS FOR PRODUCING STACKED CERAMIC COMPONENT

The present invention relates to a ceramic slurry composition and a process for producing a stacked ceramic component.

An inorganic powder-containing slurry composition is easy to handle, has good storage stability, and is easy to use as a material for producing components. For this reason, inorganic powder-containing slurry compositions are used in many fields.

For example, ceramic electronic components used in the field of electronics can be produced from green sheets obtained by forming a slurry composition containing a ceramic material powder into a sheet-like shape. A production example of the ceramic electronic components using the slurry composition as such is a stacked ceramic component such as a stacked ceramic capacitor.

As a stacked ceramic capacitor, a multi-stacked type in which dielectric layers and electrode layers are alternately stacked is generally used to miniaturize the capacitor and to increase the capacity thereof.

Stacked ceramic capacitors are produced in the following manner. First, a slurry composition containing a ceramic material powder is formed into a sheet-like shape on a carrier film to produce a ceramic green sheet. Thereafter a conductor pattern of an internal electrode is printed on the ceramic green sheet. An internal electrode paste into which at least metal particles and a ceramic material powder are mixed is used to print the conductor pattern. Namely, the internal electrode paste is used as a slurry composition containing a ceramic material powder. Due to a ceramic material powder dispersed in an internal electrode paste as such, a sintering-delay effect can be achieved and structural defects in stacked ceramic capacitors after calcination of stacked materials can be inhibited.

Next, the ceramic green sheet is removed from the carrier film, and multiple ceramic green sheets are stacked, pressurized, and formed into a stacked material. Thereafter the stacked material is cut into chips depending on necessity, which are subsequently calcined to give stacked ceramic capacitors.

As in the foregoing, during a process for producing stacked ceramic components, a slurry composition is used and simultaneously a step of handling ceramic green sheets is performed.

The Patent Appl. Publ. No. JP 2002-3219811 discloses green sheets and a ceramic molded article obtained by using a dispersion in which ceramic material powder is dispersed in a dispersion medium by using a dispersant for ceramic materials consisting of an organic acid salt, which contains an amidinium cation having a specific structure as a constituent.

Recent times have seen a reduction in the particle diameter of powder(s) contained in a slurry composition and a diversification in applications of the powder(s) in conjunction with a diversification in slurry composition applications.

For example, with the progress of miniaturization and high performance of electronic devices, the miniaturization and high performance of stacked ceramic components used therein have also been demanded. In response to the demand, particle diameter of ceramic material powder has been reduced to obtain thinner ceramic green sheets used in producing stacked ceramic components. However, the reduced particle diameter of a ceramic material powder as such has caused poor dispersibility of the powder in a slurry composition, and it has become difficult to achieve good dispersibility of a ceramic material powder.

For example, if ceramic green sheets are produced in a poorly dispersed state, namely in a state in which a ceramic material powder is aggregated, abnormal particle growth in a ceramic material powder will occur after the calcination of the thus-obtained sheets, resulting in a reduced yield, adverse effects on electrical properties, and further reduced long-term reliability of stacked ceramic components obtained by calcining the ceramic green sheets as such.

Moreover, when an internal electrode paste containing inadequately-dispersed ceramic particles is applied to printing on a ceramic green sheet, the surface roughness of the applied paste will be increased, and will adversely affect the stacked state of the ceramic green sheets on which the internal electrode paste was applied, during the stacking thereof. This causes adverse effects on the electrical properties of stacked ceramic capacitors and/or an initial failure thereof. In addition, due to a sintering-delay effect on metal powder reduced during calcination, failures such as structure defects of calcined stacked-ceramic capacitors will occur.

For slurry compositions such as the above ceramic material powder-containing slurry compositions, dispersants having a specific range of acid values are effectively used. As the dispersants, those containing a phosphoric acid group as an adsorption group (anchor group) are useful, and have been generally used. However, in cases of producing stacked ceramic components and the like by using a slurry composition containing a dispersant which contains a phosphoric acid group, the electrical properties of the obtained stacked ceramic components have sometimes been adversely affected due to phosphorous components remaining as residue or taken into the ceramic material powder after calcination.

For the reason above, the use of a dispersant exhibiting excellent powder dispersibility in a slurry composition and not remaining as ash in final products has been desired in parallel with the progress of the particle diameter reduction and application diversification of the powder(s).

In addition, the mechanical strength of final products produced by using slurry compositions has sometimes been reduced due to reduced particle diameters of powder(s) used in slurry compositions. For example, due to thinned ceramic green sheets accompanying a reduction in particle diameters of ceramic material powders, the mechanical strength of the ceramic green sheets has been reduced. For this reason, ceramic green sheets have become easily broken in the step of removing the sheets from carrier films, causing problems in the handling properties of the sheets. The patent document 1 merely insufficiently studied the improvement of the mechanical strength of ceramic green sheets, and could not obtain ceramic green sheets having sufficient mechanical strength.

Therefore, green sheets produced by using a slurry composition have been desired to have high mechanical strength.

The present invention has been completed in view of the above situations. The object of the present invention is to provide a slurry composition in which an inorganic powder exhibits excellent dispersibility, and from which green sheets with high mechanical strength can be obtained. Another object of the present invention is to provide a slurry composition in which a dispersant does not remain as ash in final product ceramics.

According to the present invention, the above problem can be solved by a slurry composition, comprising:
an inorganic powder;
a dispersant; and
a solvent,
wherein the dispersant is a block copolymer comprising at least one hydrophobic block A and at least one hydrophilic block B, and wherein the blocks A and B comprise repeating units represented by the following general formula I

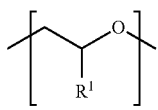

wherein $R^1$ is selected from a hydrogen atom, a linear or branched alkyl group having 1 to 10 carbon atoms and a cyclic alkyl group having 4 to 6 carbon atoms, and wherein at least one carboxylic acid group or a salt thereof is covalently linked to the block copolymer wherein the covalent link includes a carboxylic acid ester group, and wherein at least one of blocks A and B comprise the general formula (2) or (3),

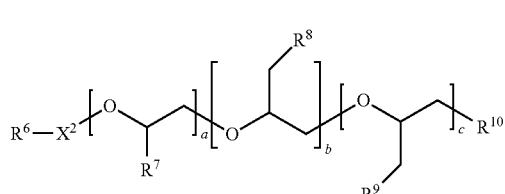

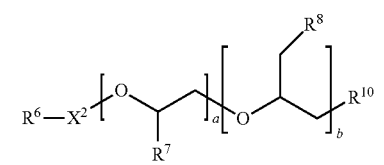

wherein in the general formulae (2) and (3),
$X^2$ is $-R^{11}-CO-$, wherein $R^{11}$ is an alkylene group having carbon atoms from 1 to 10, an alkenylene group having carbon atoms from 2 to 10, or an optionally substituted phenylene group,
$R^6$ is $-COOH$,
$R^7$, $R^8$ and $R^9$ are each independently a hydrogen atom or phenoxy group,
$R^{19}$ is $-OC_nH_{2n+1}$ or $-OC_nH_{2n}-Ph$, wherein n is from 1 to 10, and
a, b and c are from 1 to 10.

It is also preferable when the carboxylic acid ester group is a monoester group of phthalic acid, a monoester group of trimellitic acid, a monoester group of maleic acid, a monoester group of hexahydrophthalic acid, a monoester group of methyl hexahydrophthalic acid, a monoester group of methyl tetrahydrophthalic acid, a monoester group of tetrahydrophthalic acid, a monoester group of himic acid, or a monoester group of succinic acid.

More preferably, at least two carboxylic acid groups or salts thereof are covalently linked to the block copolymer, and wherein the carboxylic acid ester is a diester of a tetracarboxylic acid.

It is also preferable when the block copolymer comprises at least one end group which is an alkyl ether.

In the above formulae (2) and (3), $X^2$ is preferably $-R^{11}-CO-$, wherein $R^{11}$ is an alkylene group having carbon atoms from 1 to 10,
$R^{10}$ is $-OC_nH_{2n+1}$, wherein n is from 1 to 5,
a is from 1 to 10, and
b and c are from 1 to 5.

In embodiments wherein $X^2$ is a substituted phenylene group, the possible substituents are not particularly limited. In some embodiments, the substituent is a carboxylic acid group. In other embodiments, the substituent is a further carboxylic acid ester group, linking two polyether blocks together.

According to the present invention, the inorganic powder for the slurry composition is preferably a ceramic powder or metal powder. The slurry composition according to the present invention contains more preferably as the inorganic powder those made of barium titanate or nickel or silver.

It is also preferable when the solvent for the slurry composition according to the present invention is selected from the group consisting of toluene, ethanol, methyl ethyl ketone, dihydroterpineol, dihydroterpineol acetate and water.

According to the present invention, the slurry composition may further comprising a binder resin, and as the binder resin a polyvinyl butyral resin, an ethyl cellulose, or an acrylic resin is preferable.

The above mentioned problem can also be solved according to the present invention by a process for producing a stacked ceramic component, comprising:
repeating the following steps (1) to (3) to form a plurality of ceramic green sheets;
(1) applying the slurry composition according to the present invention on a carrier film, wherein the inorganic powder is a ceramic powder,
(2) drying the slurry composition to form a ceramic green sheet on the carrier film, and
(3) removing the carrier film from the ceramic green sheet, and thereafter
stacking the ceramic green sheets obtained; and
calcining the stacked ceramic green sheets.

The stacked ceramic component obtained according to the process of the present invention is preferably a stacked ceramic capacitor.

According to the present invention, a slurry composition with excellent dispersibility of a ceramic material powder can be provided. Moreover, green sheets produced by using the slurry composition as such have high mechanical strength. Furthermore, ash resulting from a dispersant does not remain in a final product ceramic component which is a final product.

In order to achieve a low ash content, it is preferred that the dispersant as well as the slurry contain a low amount of ash forming materials, and in particular a low amount of ions. It is preferred that the dispersant contains at most 100 ppm, and more preferred at most 50 ppm, of ions.

BRIEF DESCRIPTION OF FIGURES AND DRAWINGS

FIG. 1 Drawings showing a production example of a ceramic green sheet using a slurry composition of an embodiment of the present invention FIG. 2 Drawings showing a production example of an internal electrode paste using a slurry composition of an embodiment of the present invention FIG. 3 Drawings showing a production example of a stacked ceramic capacitor of an embodiment of the present invention An embodiment for carrying out the present invention relates to a slurry composition comprising an inorganic powder such as a ceramic material powder, a dispersant, and a solvent. The dispersant is a block copolymer comprising at least one hydrophobic block A and at least one hydrophilic block B, wherein the blocks A and B comprise repeating units represented by the following general formula I.

The structural units in the inventive dispersant are arranged block-wise.

The structural unit of the formula I is derived preferably from an alkylene oxide, more preferably from a linear, branched or cyclic alkylene oxide having 2 to 10 carbon atoms, and particularly preferably from ethylene oxide, 1,2-propylene oxide and/or 1,2-butylene oxide.

The block-like copolymers used in accordance with the present invention preferably have no ester moieties other than monoester groups of a di- or tricarboxylic acid.

The block-like copolymers used in accordance with the present invention are obtained preferably via ring-opening polymerization, particularly preferably via anionic ring-opening polymerization. The anionic polymerization can be performed by a conventional process known to the person skilled in the art.

The process described in the above publication can be adopted as a process of anionic polymerization for the production of the copolymer according to the present invention, and the process description is considered a part of the disclosure content of the present specification.

In the examples below, the fundamental production process of the copolymers employed in accordance with the present invention is elucidated in detail.

The structural units of the formula I can be prepared by ring opening polymerization of epoxides.

The starting molecule may first be polymerized with a polar glycidyl ether and/or ethylene oxide, resulting in hydrophilic structural units.

Alternatively the starting molecule may first be polymerized with an apolar glycidyl ether and/or apolar alkylene oxide, resulting in a hydrophobic structural unit. Examples include aryl glycidyl ethers, 1,2-propylene oxide, and/or 1,2-butylene oxide.

Depending on the addition of the starting compounds used in the anionic ring-opening polymerization, a copolymer of a block-like structure is obtained. The thus-obtained copolymers have at least one hydrophilic block and at least one hydrophobic block.

In the process of producing the block copolymer, a first block is polymerized until the monomer(s) are polymerized with a conversion of 80% to 100%. Therefore, the second block may contain, in addition to the monomer(s) of the second block, up to 20% of the residual monomers of the first block. Preferentially the monomer(s) of the first block are polymerized with a conversion of more than 80%, more preferentially more than 90% and most preferentially more than 95%. Preferably, the hydrophobic block is polymerized first, followed by the hydrophilic block polymerization.

According to the present invention, a polymer block containing at least 80% of hydrophilic monomer units is defined as a hydrophilic block, and a polymer block containing at least 80% of hydrophobic monomer units is defined as a hydrophobic block.

The polarity of the monomer units is defined as follows: The hydrophilic units are the structural units of the formula I derived from ethylene oxide (wherein $R^1$ is hydrogen).

The individual block of the block copolymers used in accordance with the present invention generally consists of less than 40 monomer units, preferably less than 30 monomer units, more preferably less than 20 monomer units, still more preferably less than 10 monomer units and most preferably less than 6 monomer units. The number of monomer units per block is defined by the ratio of the number of starting alcohol molecules represented by —O—$R^4$ to the number of hydrophilic and hydrophobic monomers which are used to achieve the target structure. This means if a block copolymer is synthesized by using a starting alcohol molecule, a hydrophobic monomer, and a hydrophilic monomer in a ratio of 1:7:4, the obtained polymer will be considered having 11 monomer units including 7 hydrophobic monomers and 4 hydrophilic monomers (considering a complete conversion).

The ratio of hydrophilic monomers to hydrophobic monomers may be from 90:10 to 10:90, preferably from 80:20 to 20:80, more preferably from 60:40 to 40:60, and most preferably from 55:45 to 45:55.

According to the present invention, a preferred copolymer is a diblock copolymer having preferably 1 to 20, more preferably 1 to 12, still more preferably 1 to 5, and most preferably 1 to 2 carboxylic acid groups or salts thereof.

The polymerization is preferably performed such that some of the hydroxyl groups of the starting compound are deprotonated by alkali metal hydroxides or alkali metal alkoxides to the extent from 0.1% to 80%, preferably 2% to 20%. Following removal of water or alcohols by distillation, a mixture of starting materials and a starting alcoholate is obtained. The ring-opening polymerization is typically performed in the presence of a catalyst without adding a solvent. The reaction may, however, also be performed by using an inert solvent under alkoxylation conditions.

Preferably, a glycidyl ether to be polymerized is added gradually to a mixer, and is polymerized at a temperature from 40° C. to 140° C., preferably from 50° C. to 100° C., and more preferably from 60° C. to 90° C. The living anionic polymerization accompanied by a ring-opening reaction is controlled by the rapid exchange of protons between alcohol groups and alcoholate groups of growing chains. At the end of the polymerization, neutralization is carried out with acid, and the obtained products are isolated by filtration. This can be performed with the aid of acidic ion exchangers.

Where the hydrophilic block of the copolymer used in accordance with the present invention is composed of the structural units of the formula I wherein $R^1$ is hydrogen, the alkylene oxides may be polymerized in accordance with known processes.

The intermediate may be functionalized further via free OH groups, in order, for example, to introduce carboxylic acid groups. The introduction of a carboxymethyl group can be performed with the aid of sodium hydride and sodium chloroacetate. Further methods for introducing a carboxyl group via an alkylene bridge may be performed by the addition reaction of a t-butyl acrylate or acrylonitrile, and subsequent hydrolysis. Carboxyl groups can also be introduced via an ester bond through the reaction of free hydroxyl groups of the intermediate and cyclic dicarboxylic anhydrides such as maleic anhydride or succinic anhydride. Other cyclic carboxylic anhydrides that may be used to introduce carboxylic acid groups into the intermediate are, for example, phthalic anhydride, trimellitic anhydride, hexahydrophthalic anhydride, methyl hexahydrophthalic anhydride, methyl tetrahydrophthalic anhydride, tetrahydrophthalic anhydride, and himic anhydride. If the intermediate has only one hydroxyl group, carboxylic acid groups can further be introduced to the intermediate by using cyclic anhydrides of a tetracarboxylic acid, such as pyromellitic dianhydride, to link two intermediate at the same time together. In embodiments wherein two intermediates are linked together, $X^2$ in formula (2) or (3) is typically a substituted phenylene group connecting the two intermediates.

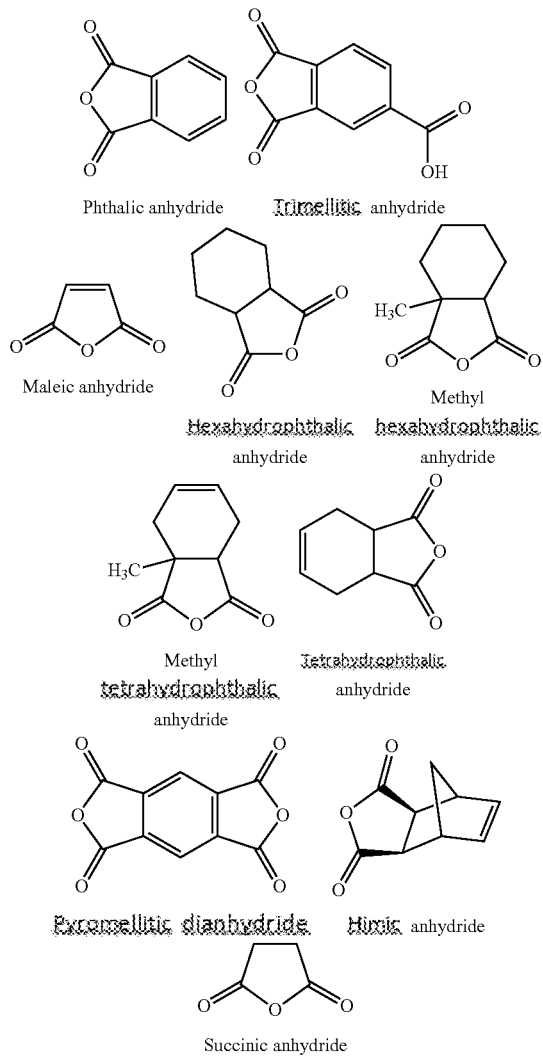

Where necessary, and in order to obtain sufficiently-functioning adsorption groups (anchor groups) for the particles to be dispersed, the carboxylic acid groups may also be converted into corresponding salts, through a reaction with a base. Suitable salts are ammonium salts, prepared by reaction with ammonia or with a suitable organic amine, tertiary amines, preferably triethylamine, alkanolamines, such as triethanolamine, for example, or tetraalkylammonium hydroxide.

The slurry composition according to the present invention may further comprise a wetting agent and/or a dispersant or a dispersant aid, which differ from the acidic copolymer dispersant used in accordance with the present invention in such a range that the effect of the present invention is not impaired. The types of those additional wetting agents, dispersants and dispersant aids are not particularly limited as long as the effects of the present invention are not impaired.

The slurry composition of the present invention can be used in various applications. For example, the slurry composition can be used as a starting material for producing a ceramic green sheet, a starting material for producing an inner electrode (inner electrode paste), or as a pretreatment agent.

The dispersibility of the ceramic starting material powder in the slurry composition is improved even when the particle size of the ceramic starting material powder is reduced when the slurry composition of the present invention is used as a starting material for producing a ceramic green sheet. As a result, the ceramic starting material powder can be uniformly dispersed in the ceramic green sheet obtained from the slurry composition. Deterioration of the yield of stacked ceramic components obtained by calcining the ceramic green sheet, negative influence on electrical properties, and deterioration of long term reliability can be prevented thereby. Also, mechanical strength of ceramic green sheets can be improved, and ceramic green sheets with superior handleability can be obtained. Furthermore, since the obtained ceramic green sheets have superior sheet strength, the sheets will withstand the printing, removing and stacking process even when the layer thickness is reduced. As a result, improvement of the properties of the final product and downsizing can be enhanced. In addition, since the present invention does not require the use of conventional dispersants using phosphoric acid as an adsorbing group, residual phosphorus component after calcination and negative influence on the electrical properties of the final product caused by the contamination of the ceramic starting material powder by the phosphorus component can be avoided.

The dispersibility of the ceramic starting material powder in the slurry composition is improved when the slurry composition of the present invention is used as the starting material for producing an inner electrode (inner electrode paste). As a result, the ceramic starting material powder is uniformly dispersed in the inner electrode produced from the slurry composition. Surface roughness can therefore be reduced when printing the inner electrode paste onto a ceramic green sheet, and negative influence on the state of stacking at the time of stacking ceramic green sheets printed with the inner electrode paste can be avoided, and negative influence on and initial failure of stacked ceramic capacitors can be avoided thereby. Also, superior sintering delay effect of the metal powder can be maintained at the time of calcination, and structural defects and the like of stacked ceramic capacitors after calcination can be prevented thereby.

Easy dispersibility in later process is enhanced when using the slurry composition of the present invention as a pretreatment agent of a powder, and reduction of the production lead time and process costs can be realized thereby.

Components that constitute the slurry composition of the present invention and applications thereof are explained below in detail. However, the slurry composition of the present invention is not limited to those comprising the components mentioned below or by the applications mentioned below.

(Inorganic Powder)

There is no particular limitation to the powder used in the slurry composition since the dispersant used in the present invention enables superior dispersibility of inorganic powders, and various types of inorganic powders can be used. Examples of the inorganic powder include metal powder, powder of minerals, ceramic starting material powder, and powders of other inorganic materials.

Examples of metal powder include powders of platinum, gold, silver, copper, palladium, rhodium, zinc, cobalt, indium, nickel, chromium, antimony, bismuth, germanium, cadmium and the like. Powders of alloys of these metals can also be used. Examples of powder of minerals include powders of kaolinite, talc, mica, sericite, chlorite, montmorillonite, halloysite and the like.

Examples of ceramic starting material powder include powders of metal oxides, metal carbonates, composite oxides and the like; specifically, powders of metal oxides such as alumina, titanium oxide, magnesium oxide, barium oxide and aluminum oxide, metal carbonates such as magnesium carbonate and barium carbonate, and composite oxides such as barium zirconate, calcium zirconate, calcium titanate, barium titanate and strontium titanate.

In general, the surface of a ceramic starting material powder has both an acid point and a base point. In the case of a ceramic starting material powder, the amount of base is higher than the amount of acid. The acid point and the base point of a ceramic starting material powder in a solvent can be determined by a back titration method, for example.

Barium titanate is preferably used as the ceramic starting material powder when a stacked ceramic capacitor is produced with the use of the slurry composition of the present invention. Stacked ceramic electronic components other than a stacked ceramic capacitor produced by the slurry composition of the present invention include inductors, thermistors, piezoelectric components and the like. Therefore, magnetic ceramic materials, semiconductor ceramic materials, piezoelectric ceramic materials and the like can be used in addition to dielectric ceramic materials as the ceramic starting material powder depending on the functions of the stacked ceramic electronic components.

Examples of other powders include powders of aluminum hydroxide, silica, barite powder, zinc oxide, zinc sulfate, antimony oxide, carbon black, acetylene black, aniline black, chrome yellow, zinc chrome, barium chromate, iron oxide, amber, permanent brown, rose brown, red oxide, cadmium red, permanent red 4R, para red, fire red, cobalt purple, manganese purple, fast violet B, methyl violet lake, ultramarine, iron blue, alkali blue lake, phthalocyanine blue, chrome green, viridian, emerald green, phthalocyanine green, zinc sulfate, zinc silicate, zinc cadmium sulfide, strontium sulfate and the like.

Among these powders, barium titanate powder and nickel or silver powder are preferably used. For example, a slurry composition comprising barium titanate powder can be used as the starting material for a ceramic green sheet, and a slurry composition comprising barium titanate powder and nickel or silver powder can be used as the starting material for an inner electrode (inner electrode paste).

Although there is no particular limitation to the particle size of the powder, it is preferably from 0.1 to 500 nm, more preferably from 0.5 to 300 nm, even more preferably from 1 to 200 nm, when measured by the dynamic light scattering method. The powder can be uniformly dispersed in the solvent by the present invention even when the powder has a small particle size, and a slurry composition in which the powder exhibits superior dispersibility even when the powder has a small particle size can therefore be obtained.

The content of the powder in the slurry composition is preferably from 10 to 80% by weight, more preferably from 20 to 70% by weight, even more preferably from 30 to 60% by weight.

(Dispersant)

When the slurry composition of the present invention is used for producing a ceramic green sheet, the optimal range of the amount of the dispersant according to the present invention used in the ceramic green sheet varies depending on the specific surface area of the ceramic starting material powder. A standard content of the dispersant can be calculated by assuming the value obtained by dividing the specific surface area [unit: $m^2/g$] of the ceramic starting material powder by 5 as the amount of the active ingredient. When using barium titanate powder as the ceramic starting material powder, for example, the standard content of the dispersant relative to 100 parts by weight of barium titanate is 1 part by weight in terms of active ingredient when the particle size is 200 nm (specific surface area: 5 $m^2/g$), 2 parts by weight in terms of active ingredient when the particle size is 100 nm (specific surface area: 10 $m^2/g$), and 4 parts by weight in terms of active ingredient when the particle size is 50 nm (specific surface area: 20 $m^2/g$).

(Solvent)

There is no particular limitation to the solvents used in the slurry composition, and water or organic solvents can be used as the solvent, for example. Examples of organic solvents include alcohols such as methanol, ethanol, n-propanol, isopropanol (IPA), n-butanol, sec-butanol, n-octanol, ethylene glycol, diethylene glycol, diacetone alcohol, benzyl alcohol, terpineol and butyl carbitol; cellosolves such as methyl cellosolve, ethyl cellosolve and butyl cellosolve; ketones such as acetone, methyl ethyl ketone (MEK), methyl isobutyl ketone (MIBK), diisobutyl ketone (DIBK), cyclohexanone and isophorone; amides such as N,N-dimethylacetamide, N,N-dimethylformamide and N-methyl-2-pyrrolidone; esters such as methyl acetate, ethyl acetate, isopropyl acetate, n-butyl acetate and butyl carbitol acetate; ethers such as ethyl ether, dioxane and tetrahydrofuran; hydrocarbons such as naphtha, n-hexane and cyclohexane; and aromatics such as toluene, xylene and pyridine.

As mentioned later, when using a polyvinyl butyral resin as the binder resin, an alcohol, a cellosolve or a mixture of said solvents with other solvents is preferably used in terms of solubility.

(Binder Resin)

The slurry composition of the present invention may comprise a binder resin. There is no particular limitation to the binder resin as long as it has a function as a binder. Polyvinyl butyral resin, ethyl cellulose or acrylic resin is preferably used as the binder resin. Polyvinyl butyral resin or acrylic resin is more preferably used as the binder resin when using the slurry composition as a starting material for producing a ceramic green sheet, and ethyl cellulose is more preferably used as the binder resin when using the slurry composition as a starting material for producing an inner electrode.

Polyvinyl butyral resin can be produced for use or commercially available products can be used. Examples of commercially available products include completely saponified polyvinyl alcohols such as Kuraray Poval PVA-102, PVA-103, PVA-105, PVA-110, PVA-117, PVA-120, PVA-124, PVA-126, PVA-135, PVA-CSA, PVA-CST, PVA-HC (from Kuraray); Gohsenol NH-26, NH-20, NH-18, N-300, NM-14, NM-11, NL-05 (from Nippon Gosei Kagaku); Denka Poval K-24E, K-17C, K-17E, K-05 (from Denki Kagaku Kogyo); partially saponified polyvinyl alcohols such as Kuraray Poval PVA-617, PVA-624, PVA-613, PVA-706, PVA-203, PVA-205, PVA-210, PVA-217, PVA-220, PVA-224, PVA-228, PVA-235, PVA-217E, PVA-217EE, PVA-220E, PVA-224E, PVA-403, PVA-405, PVA-420, PVA-420H, PVA-424H, L-8, L-9, L-9-78, L-10, PVA-505 (from Kuraray); Gohsenol AH-26, AH-20, AH-17, A-300, C-500, P-610, AL-06, GH-23, GH-20, GH-17, GM-14, GM-14L, GL-05, GL-03, KH-20, KH-17, KM-11, KL-05, L-03, KP-08, KP-06, NK-05 (from Nippon Gosei Kagaku); Denka Poval H-24, H-17, H-12, B-33, B-24T, B-24, B-20, B-17R, B-17, B-05, B-04 (from Denki Kagaku Kogyo); copolymers of polyvinyl alcohol and ethylene such as Soarnol D2908, DT2903, DC3212, DC3203, E3808, ET3803, A4412, AT4406, AT4403 (from Nippon Gosei Kagaku); polyvinyl butyral resins such as S-Lec B BL-1, BL-2, BL-2H, BL-S, BL-SH, BX-10, BX-L, BM-1, BM-2, BM-5, BM-S, BM-SH, BH-3, BH-S, BX-1, BX-3, BX-5 (from Sekisui Kagaku Kogyo).

The content of the binder resin in the slurry composition is preferably 0.5 parts by weight or more, more preferably 1 part by weight or more, even more preferably 2 parts by weight or more, relative to 100 parts by weight of the powder in terms of improving the mechanical strength of the green sheet produced by using the slurry composition and of better achieving the function as a binder. Also, said content is preferably 20 parts by weight or less, more preferably 15 parts by weight or less, even more preferably 12 parts by weight or less, based on 100 parts by weigh of the powder in terms of reducing the viscosity of the slurry composition so as to improve its handleability. When the slurry composition comprises a ceramic starting material powder and a polyvinyl butyral resin as the binder resin, the content of the polyvinyl butyral resin is preferably from 0.5 to 20 parts by weight, more preferably from 1 to 15 parts by weight, even more preferably from 2 to 12 parts by weight, relative to 100 parts by weight of the ceramic starting material powder.

Plasticizer

The slurry composition may comprise a plasticizer for the purpose of improving the flexibility and removability of the green sheet produced by using the slurry composition. There is no particular limitation to the plasticizer used, and examples thereof include phthalic acid diesters such as bis(2-ethylhexyl)phthalate, dioctyl phthalate and dibutyl phthalate; adipic acid esters such as dioctyl adipate; and alkylene glycol diesters such as triethylene glycol bis(2-ethylhexanoate). Among these plasticizers, bis(2-ethylhexyl)phthalate and dioctyl phthalate are preferably used in terms of low volatility and maintenance of the flexibility of the sheet.

The content of the plasticizer in the slurry composition of the present invention is preferably 5 parts by weight or more, more preferably 10 parts by weight or more, even more preferably 15 parts by weight or more, relative to 100 parts by weight of the polyvinyl butyral resin in terms of further improving the flexibility of the green sheet produced by using the slurry composition. Also, said content is preferably 60 parts by weight or less, more preferably 55 parts by weight or less, even more preferably 50 parts by weight or less, relative to 100 parts by weight of the polyvinyl butyral resin in terms of further improving the removability of the green sheet produced by using the slurry composition. When using a slurry composition comprising a polyvinyl butyral resin as the binder resin, the content of the plasticizer is preferably from 5 to 60 parts by weight, more preferably from 10 to 55 parts by weight, even more preferably from 15 to 50 parts by weight, relative to 100 parts by weight of the polyvinyl butyral resin.

Further Components

The slurry composition of the present invention may further comprise low-molecular-weight compounds and the like as additives, such as an antistatic agent, a lubricating agent, a dispersion auxiliary and the like within a range that does not deteriorate the effects of the present invention.

Applications of the Slurry Composition

The slurry composition of the present invention is useful in various applications. A ceramic green sheet, an inner electrode paste, a stacked ceramic capacitor and a pretreatment agent are described below as the examples of the slurry composition of the present invention or the examples of the products obtained by using the slurry composition of the present invention.

FIG. 1 is a schematic drawing explaining a process for producing a ceramic green sheet using the slurry composition of the present invention. First, a slurry composition 3 is formed by mixing a ceramic starting material powder 1 such as barium titanate ($BaTiO_3$), the dispersant of the present invention (not shown in the figure), a solvent 2, and a binder resin (not shown in the figure) (FIG. 1(a)). A toluene/ethanol mixed solvent or methyl ethyl ketone (MEK) can be used as the solvent, and a polyvinyl butyral resin or an acrylic resin can be used as the binder resin, for example. The slurry composition 3 is applied onto a carrier film 4 (FIG. 1(b)), and then the slurry composition is dried so as to form a ceramic green sheet 5 on the carrier film (FIG. 1(c)).

As explained above, the process for producing a ceramic green sheet comprises the steps of mixing a ceramic starting material powder, the dispersant of the present invention, a solvent, and a binder resin so as to form a slurry composition, applying the slurry composition onto a carrier film, and drying the slurry composition applied onto the carrier film so as to form a ceramic green sheet.

FIG. 2 is a schematic drawing explaining a process for producing an inner electrode paste, which is the slurry composition of the present invention. A slurry composition (inner electrode paste) 3 is formed (FIG. 2(b)) by mixing a ceramic starting material powder 1 such as barium titanate, a metal powder 6 such as nickel powder, the dispersant of the present invention (not shown in the figure), a solvent 2, and a binder resin (not shown in the figure) (FIG. 2(a)). A mixed solvent of (dihydro)terpineol and (dihydro)terpineol acetate can be used as the solvent, and ethyl cellulose can be used as the binder resin, for example. When using barium titanate powder and nickel powder, the inner electrode paste preferably contains 10 to 20 parts by weight of barium titanate powder based on 100 parts by weight of the nickel powder. Also, the nickel powder preferably has a particle size of 50 to 300 nm, and the barium titanate powder preferably has a particle size of 5 to 100 nm.

As explained above, the process for producing an inner electrode paste comprises the step of mixing a ceramic starting material powder, a metal powder, the copolymer dispersant of the present invention, a solvent and a binder resin so as to form a slurry composition.

FIG. 3 is a schematic drawing explaining the process for producing a stacked ceramic capacitor. An inner electrode paste 7 formed as shown in FIG. 2 is printed (FIG. 3(a)) onto a ceramic green sheet 5 formed as shown in FIG. 1 with the use of a screen mask (not shown in the figure) to which many electrode patterns are formed. The ceramic green sheet 5 printed with the inner electrode paste 7 is removed from the carrier film 4 (FIG. 3(b)). Multiple ceramic green sheets are formed by repeating the steps of FIGS. 3(a) and (b). The multiple ceramic green sheets are stacked and pressed so as to obtain a stacked product 8 in which ceramic layers and inner electrode layers are alternately stacked (FIG. 3(c)). The thus formed stacked product 8 is cut into chips as necessary (chip-producing step not shown in the figure), and then calcined (FIG. 3(d)). Outer electrodes 12 are formed to the obtained calcined stacked product 8 so as to obtain a stacked ceramic capacitor 13 having outer electrodes 12 facing one another on either side (FIG. 3(e)).

As explained above, the process for producing a stacked ceramic capacitor comprises the steps of mixing a ceramic starting material powder, the dispersant of the present invention, a solvent and a binder resin so as to form a slurry composition, forming multiple ceramic green sheets onto which an inner electrode paste is printed by repeating the following steps (1) to (4):

(1) a step for applying the slurry composition onto a carrier film, (2) a step for forming a ceramic green sheet by drying the slurry composition applied onto the carrier film, (3) a step for printing an inner electrode paste onto the ceramic green sheet, and (4) a step for removing the ceramic green sheet printed by using the inner electrode paste from the carrier film, stacking the multiple ceramic green sheets and pressing the same to form a stacked product in which ceramic layers and inner electrode layers are alternately stacked, calcining the stacked product, and forming outer electrodes facing one another to either side of the stacked product as to obtain a stacked ceramic capacitor.

The slurry composition of the present invention is also applicable as a pretreatment agent useful in the production processes of various products. A ceramic starting material powder such as barium titanate is added to a solvent such as water, and the dispersant of the present invention is added to the solvent so as to produce a pretreatment agent. A slurry composition (pretreatment agent) wherein barium titanate powder is dispersed in water by the dispersant is obtained thereby. If necessary, a dried pretreatment agent can also be used. In such a case, the dispersant is adhered to the surface of the ceramic starting material powder, and a pretreatment agent can be obtained by adding a solvent such as water when needed.

As explained above, the process for producing a pretreatment agent comprises the step of mixing a ceramic starting material powder, a solvent and the dispersant of the present invention.

Also, the process for producing a stacked ceramic component of the present invention comprises the steps of forming multiple ceramic green sheets by repeating the following steps (1) to (3):

(1) a step for applying the slurry composition according to any one of claims 1 to 13 on a carrier film, wherein the inorganic powder is a ceramic starting material powder, (2) a step for drying the slurry composition to form a ceramic green sheet on the carrier film, and (3) a step for removing the ceramic green sheet off from the carrier film, stacking the removed ceramic green sheets, and calcining the stacked ceramic green sheets.

EXAMPLES

The present invention will now be described with reference to the following examples, which are not intended to limit the scope of the present invention.

(Analytical Measuring Methods)

Measurement of Acid Numbers

The acid number is the KOH quantity that is required for neutralizing 1 g of substance under the defined conditions. The acid numbers were determined by a neutralization reaction with a 0.1 N KOH in ethanol according to DIN EN ISO 2114.

For dispersant 5* (comparative example), a 0.1 N aqueous NaOH solution was used for the neutralization reaction.

Measurement of Hydroxyl Numbers.

The alcoholic hydroxyl groups were reacted by acetylation with an excess of acetic anhydride. The excess acetic anhydride is cracked into acetic acid by adding water and titrated back using ethanolic KOH solution. The hydroxyl number is understood to be the KOH quantity in mg which is equivalent to the acetic acid quantity bound when acetylating 1 g of substance.

NMR Measurements

The NMR measurements were carried out on a Bruker DPX 300 at 300 MHz ($^1$H) or 75 MHz ($^{13}$C). Solvents used were deuterated chloroform (CDCl$_3$) and deuterated dimethyl sulfoxide (DMSO-d$_6$).

Dispersants

The following commercial available raw materials were used:

Lutensol TO 6: Alkoxylate (RO(CH$_2$CH$_2$O)$_6$H with R=iso-C$_{13}$H$_{27}$) purchased from BASF, hydroxyl value: 120 mg KOH/g Polyglycol B11/50: Polyalkylene glycol (PAG), n-butanol started with an EO:PO ratio of 1:1 purchased from Clariant, hydroxyl value: 42 mg KOH/g Polyglycol B01/20: Polyalkylene glycol (PAG), n-butanol started with an EO:PO ratio of 0:1 purchased from Clariant, hydroxyl value: 80 mg KOH/g The following ion exchanger was used in the synthesis process of the polyethers:

Amberlite IR-120H: Strongly acidic cation exchange resin, purchased from Sigma-Aldrich Preparation of Polyether Intermediates:

(Block Polyether 1)

The alkoxylation was carried out in a pressure reactor equipped with stirrer and thermostat. 185.3 g (1 equiv) of methoxypropanol and 1.3 g KOH 85% was introduced, and the reactor was closed, evacuated and rendered inert with nitrogen. The water in the reactor was evacuated under vacuum and the reactor rendered inert with nitrogen again. Following heating to 135° C., 358.2 g (3 equiv) of propylene oxide was metered in at a rate such that a maximum pressure of 5 bar was not exceeded. After the end of the metered addition and subsequent reaction at 135° C. until the pressure remained constant, 453.0 g (5 equiv) of ethylene oxide was metered in the same way. After the end of the metered addition and subsequent reaction at 135° C. until the pressure remained constant, cooling took place to room temperature following with de-alkalization with an acidic cation exchanger resin (Amberlite IR-120H). The hydroxyl value of the obtained block polyether was 118 mg KOH/g.

(Polyether 2, Not Inventive)

The alkoxylation was carried out in a pressure reactor equipped with stirrer and thermostat. 185.3 g (1 equiv) of methoxypropanol and 1.3 g KOH 85% were introduced, and the reactor was closed, evacuated and rendered inert with nitrogen. The water in the reactor was evacuated under vacuum and the reactor rendered inert with nitrogen again. Following heating to 135° C., a mixture of 358.2 g (3 equiv)

of propylene oxide and 453.0 g (5 equiv) of ethylene oxide was metered in at a rate such that a maximum pressure of 5 bar was not exceeded. After the end of the metered addition and subsequent reaction at 135° C. until the pressure remained constant, cooling took place to room temperature following de-alkalization with an acidic cation exchanger resin (Amberlite IR-120H). The hydroxyl value of the obtained polyether was 118 mg KOH/g.

(Block Polyether 3)

The preparation of polyether 3 was done in two reaction steps.

a) In a first reaction step, a poly(phenyl glycidyl ether) intermediate was prepared starting from 3-phenylpropan-1-ol. For this purpose, a 500 ml 4-necked flask equipped with a stirrer, a condenser, a thermostat and a dropping funnel was charged with 136.2 g (1.0 equiv) of 3-phenylpropan-1-ol and with 4.48 g (0.04 equiv) of potassium tert-butylate.

Under nitrogen and with stirring, this initial charge was heated to 105° C. With a gentle nitrogen stream, the tert-butanol formed at 105° C. was removed in an hour. The temperature was then raised to 120° C. and 300.34 g (2.0 equiv) of phenyl glycidyl ether were added dropwise over the course of one hour. After the end of the metered addition, stirring was continued at 120° C. for 4 hours until it was possible to ascertain complete conversion of the monomer according to $^1$H NMR analysis.

b) In a second reaction step, the resulting intermediate from step a) was subsequently ethoxylated.

This alkoxylation was carried out in a pressure reactor equipped with a stirrer and a thermostat. 392.8 g (0.9 equiv) of the poly(phenyl glycidyl ether) intermediate were introduced, and the reactor was closed, evacuated, and rendered inert using nitrogen. Following heating to 135° C., 396.0 g (9.0 equiv) of ethylene oxide were metered in at a rate such that a maximum pressure of 5 bar was not exceeded. After the end of the metered addition and subsequent reaction at 135° C. until the pressure remained constant, cooling took place to room temperature. The block copolymer obtained was subsequently dissolved in methanol and neutralized with an acidic ion exchanger, Amberlite IR-120H. Following the removal of the ion exchanger by filtration, the methanol was removed under reduced pressure. The hydroxyl value of the obtained block polyether was 64 mg KOH/g.

(Block Polyether 4)

a) For preparing the block polyether 4, the poly(phenyl glycidyl ether) intermediate prepared starting from 3-phenylpropan-1-ol and obtained in accordance with reaction step a) of the block polyether 3 was used as starter for an alkoxylation reaction.

b) Propoxylation/ethoxylation of the poly(phenyl glycidyl ether) intermediate

The alkoxylation was carried out in a pressure reactor equipped with a stirrer and a thermostat. 392.8 g (0.9 equiv) of the poly(phenyl glycidyl ether) intermediate were introduced, and the reactor was closed, evacuated and rendered inert with nitrogen. Following heating to 135° C., 104.4 g (1.8 equiv) of propylene oxide were metered in at a rate such that a maximum pressure of 5 bar was not exceeded. After the end of the metered addition and subsequent reaction at 135° C. until the pressure remained constant, 396.0 g (9.0 equiv) of ethylene oxide were metered in the same way. After the end of the metered addition and subsequent reaction at 135° C. until the pressure remained constant, cooling took place to room temperature. The block copolymer obtained was subsequently dissolved in methanol and neutralized with an acidic ion exchanger resin, Amberlite IR-120H. Following the removal of the ion exchanger by filtration, the methanol was removed under reduced pressure. The hydroxyl value of the obtained block polyether was 56 mg KOH/g.

(Block Polyether 5)

The alkoxylation was carried out in a pressure reactor equipped with stirrer and thermostat. 136.2 g (1.0 mol) of 3-phenylpropan-1-ol and 1.0 g KOH 85% were introduced, and the reactor was closed, evacuated and rendered inert with nitrogen. The water in the reactor was evacuated under vacuum and the reactor rendered inert with nitrogen again. Following heating to 135° C., 232.3 g (4.0 mol) of propylene oxide was metered in at a rate such that a maximum pressure of 5 bar was not exceeded. After the end of the metered addition and subsequent reaction at 135° C. until the pressure remained constant, 352.4 g (8.0 mol) of ethylene oxide was metered in the same way. After the end of the metered addition and subsequent reaction at 135° C. until the pressure remained constant, cooling took place to room temperature following de-alkalization with an acidic cation exchanger resin (Amberlite IR-120H). The hydroxyl value of the obtained block polyether was 77 mg KOH/g.

Dispersants 1 to 11 were prepared as described below.

(Dispersant 1)

A 2000 ml 4-necked flask equipped with a stirrer, a reflux condenser and a thermostat was charged with 951 g of the block polyether 1, 200 g of succinic anhydride, 6 ml of butyl acetate and 0.6 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 96 mg KOH/g.

(Dispersant 2*, * Indicates a Comparative Example)

A 2000 ml 4-necked flask equipped with a stirrer, a reflux condenser and a thermostat was charged with 935 g of Lutensol TO 6, 200 g of succinic anhydride, 6 ml of butyl acetate and 0.6 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 97 mg KOH/g.

(Dispersant 3*, * Indicates a Comparative Example)

A 2000 ml 4-necked flask equipped with a stirrer, a reflux condenser and a thermostat was charged with 1403 g of polyglycol B01/20, 200 g of succinic anhydride, 8 ml of butyl acetate and 0.8 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 68 mg KOH/g.

(Dispersant 4*, * Indicates a Comparative Example)

A 2000 ml 4-necked flask equipped with a stirrer, a reflux condenser and a thermostat was charged with 1336 g of polyglycol B11/50, 100 g of succinic anhydride, 7 ml of butyl acetate and 0.7 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 41 mg KOH/g.

(Dispersant 5*, * Indicates a Comparative Example)

A 1000 ml 4-necked flask equipped with a stirrer, a reflux condenser and a thermostat was charged with 668 g of polyglycol B11/50, and heated to 80° C. 55.9 g of polyphosphoric acid was added in portions. After the addition of polyphosphoric acid, the reaction mixture was stirred at 80°

C. until NMR analysis showed a complete conversion of the polyether. The obtained dispersant had an acid value of 103 mg KOH/g.

(Dispersant 6*, * Indicates a Comparative Example)

A 2000 ml 4-necked flask equipped with a stirrer, a reflux condenser and a thermostat was charged with 951 g of polyether 2, 200 g of succinic anhydride, 6 ml of butyl acetate and 0.6 g of K2003. The reaction mixture was heated to 130° C. and reacted until NMR analysis showed a complete conversion of the anhydride. Thereafter, potentially present solid constituents were removed by filtration. The obtained dispersant had an acid value of 98 mg KOH/g.

(Dispersant 7)

A 2000 ml 4-necked flask equipped with a stirrer, a reflux condenser and a thermostat was charged with 951 g of block polyether 1, 196 g of maleic anhydride, 6 ml of butyl acetate and 0.6 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 97 mg KOH/g.

(Dispersant 8)

A 2000 ml 4-necked flask equipped with a stirrer, a reflux condenser and a thermostat was charged with 951 g of block polyether 1, 296 g of phthalic anhydride, 6 ml of butyl acetate and 0.6 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 89 mg KOH/g.

(Dispersant 9)

A 2000 ml 4-necked flask equipped with a stirrer, a reflux condenser and a thermostat was charged with 877 g of block polyether 3, 98 g of maleic anhydride, 5 ml of butyl acetate and 0.5 g of $K_2CO_3$ The reaction mixture was heated to 130° C. and reacted until NMR analysis showed a complete conversion of the anhydride. Thereafter, potentially present solid constituents were removed by filtration. The obtained dispersant had an acid value of 59 mg KOH/g.

(Dispersant 10)

A 2000 ml 4-necked flask equipped with a stirrer, a reflux condenser and a thermostat was charged with 1002 g of block polyether 4, 98 g of maleic anhydride, 6 ml of butyl acetate and 0.6 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 53 mg KOH/g.

(Dispersant 11)

A 2000 ml 4-necked flask equipped with a stirrer, a reflux condenser and a thermostat was charged with 1457 g of block polyether 5, 196 g of maleic anhydride, 8 ml of butyl acetate and 0.8 g of $K_2CO_3$. The reaction mixture was heated to 130° C. and reacted until NMR analysis showed a complete conversion of the anhydride. Thereafter, potentially present solid constituents were removed by filtration. The obtained dispersant had an acid value of 69 mg KOH/g.

(Dispersant 12)

A 1000 ml 4-necked flask equipped with a stirrer, a thermostat and a dropping funnel was charged with 630 g of dispersant 8 obtained in example 8 and heated to 60° C. At this temperature, 101 g of N,N-diethylethanamine was metered in at a rate such that a maximum temperature of 80° C. was not exceeded. The reaction mixture was stirred for one hour after finalization of the metering at 60° C. The amine salt of dispersant 8 was obtained after cooling down to room temperature. The obtained dispersant had an acid value of 77 mg KOH/g, and the ratio of acid groups: amine groups was 1:1.

(Slurry Composition)

One of the dispersants (dispersants 1 or dispersants 2*-6*), barium titanate powder (particle size: 100 nm) used as the ceramic starting material powder, polyvinyl butyral resin used as the binder resin, dioctyl phthalate used as the plasticizer, and a mixture of toluene/ethanol=50:50 (weight ratio) used as the solvent were charged into a container of a desktop planetary centrifugal mixer according to the formulations shown in Table 1, and zirconia beads with a diameter of 1 mm were added thereto. The mixer was revolved for 60 seconds at 2500 rpm so as to obtain the slurry compositions. Comparative Example 1 was prepared without the use of a dispersant.

TABLE 1

| Material | | Ex. 1 | Cmp. Ex. 1 | Cmp. Ex. 2 | Cmp. Ex. 3 | Cmp. Ex. 4 | Cmp. Ex. 5 | Cmp. Ex. 6 |
|---|---|---|---|---|---|---|---|---|
| Barium titanate (g) | | 51.68 | 51.68 | 51.68 | 51.68 | 51.68 | 51.68 | 51.68 |
| Plasticizer (g) (Dioctyl phthalate) | | 1.92 | 1.92 | 1.92 | 1.92 | 1.92 | 1.92 | 1.92 |
| Mixed solvent (g) Toluene/ ethanol (50/50 (weight ratio)) | | 25.88 | 26.4 | 25.88 | 25.88 | 25.88 | 25.88 | 25.88 |
| Zirconia beads (diameter: 1 mm) (g) | | 8 | 8 | 8 | 8 | 8 | 8 | 8 |
| Dispersant | Number | 1 | — | 2* | 3* | 4* | 5* | 6* |
| | Added amount (g) | 0.52 | — | 0.52 | 0.52 | 0.52 | 0.52 | 0.52 |

*indicates a comparative example

After removing zirconia beads from the obtained slurry compositions, a vehicle solution obtained by dissolving a polyvinyl butyral resin in a toluene/ethanol mixed solvent was added thereto in accordance with the formulations shown in Table 2. Thereafter, the obtained mixtures were mixed for 300 seconds at 2500 rpm in the planetary centrifugal mixer.

TABLE 2

| Material | Ex. 1 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Slurry composition of Table 1 (g) | 60.3 | 60.3 | 60.3 | 60.3 | 60.3 | 60.3 | 60.3 |
| Vehicle solution (g) | 14.7 | 14.7 | 14.7 | 14.7 | 14.7 | 14.7 | 14.7 |

14.7 g of the vehicle solution shown in Table 2 consists of 3.3 g of a polyvinyl butyral resin and 11.4 g of a toluene/ethanol mixed solvent.

After adding 0.3 g of a silicon-based surface modifier, BYK-333, to the obtained ceramic slurry compositions having the formulations shown in Table 2, each mixture was mixed for 60 seconds at 2500 rpm in the desktop planetary centrifugal mixer so as to obtain ceramic slurry compositions.

The ceramic slurry compositions of Example 1 and Comparative Examples 1 to 6 shown in Table 2 were applied onto a PET (polyethylene terephthalate) film in a thickness of 30 μm by using a BYK Gardner PA-5354 applicator, then dried so as to obtain ceramic green sheets.

The dispersant 1 and the dispersants 2*-6*, the ceramic slurry compositions, and the ceramic green sheets obtained as described above were evaluated in terms of the following points.

Ash Content

Thermogravimetric measurement was performed with respect to dispersant 1 and the dispersants 2*-6* at a temperature increase rate of 20 K/min using TGA Q5000 from TA-Instrument to evaluate the ash content.

(Viscosity-Reducing Effect)

Viscosity of the ceramic slurry compositions obtained in accordance with the formulations shown in Table 2 was measured by using an E-type viscometer from Brookfield. High viscosity-reducing effect means superior dispersibility of the ceramic starting material powder realized by the dispersant.

(Sheet Strength)

The obtained ceramic green sheets were punched into dumbbell shapes to obtain samples for evaluating the tensile strength. The samples were subjected to a tensile test at a rate of 1 mm/min using a 100 nM load cell by using a tensile testing machine Roell ZMART. PRO 1465 from ZWICK. The maximum elongation at break was measured so as to evaluate the sheet strength. The results are shown in Table 3.

TABLE 3

| Test | Ash content (% by weight) | Viscosity (cP) | Maximum elongation at break (%) |
| --- | --- | --- | --- |
| Ex. 1 | 0.1% or less | 3.1 | 18.2 |
| Comp. Ex. 1 | — | No film formation due to gelation | |
| Comp. Ex. 2 | 0.1% or less | 3.1 | 6.3 |
| Comp. Ex. 3 | 0.1% or less | 7.75 | 7.6 |
| Comp. Ex. 4 | 0.1% or less | 6.2 | 10.6 |
| Comp. Ex. 5 | 5.0% or more | 3.1 | 15.9 |
| Comp. Ex. 6 | 0.1% or less | 3.1 | 8.2 |

The ash content of 0.1% or less in Table 3 was considered to mean no ash content. Also, high maximum elongation at break in Table 3 was understood to show high sheet strength.

As shown in Table 3, in Comparative Example 1 in which no dispersant was used, formation of a slurry at initial dispersion failed, and the test could not be continued. In contrast, in Example 1 and Comparative Examples 2 to 6, at least a slurry was obtained and the test could be performed. Although the dispersibility of the barium titanate powder varied depending on the dispersant used, it is to be understood that the barium titanate powder was dispersed by the dispersant and the viscosity of the ceramic slurry composition was reduced thereby.

In Example 1 in which the dispersant of the present invention was used, no ash content was confirmed, viscosity of the ceramic slurry composition was low (excellent dispersibility of the ceramic starting material powder was attained), and high sheet strength of the ceramic green sheet was achieved. In contrast, in Comparative Example 2, although no ash content was confirmed and high viscosity-reducing effect was achieved, the strength of the ceramic green sheet was low. In Comparative Example 3, although no ash content was confirmed, the viscosity-reducing effect and the sheet strength of the obtained ceramic green sheet were low. In Comparative Example 4, although no ash content was confirmed, viscosity-reducing effect was achieved, and the sheet strength of the ceramic green sheet was high to a certain extent, these effects were not as high as those achieved by Example 1. In Comparative Example 5, although viscosity-reducing effect and high sheet strength of the ceramic green sheet were achieved, residual ash content was confirmed since the dispersant contained phosphorus. The application of the ceramic green sheet of Comparative Example 5 to a stacked ceramic component is therefore considered to cause negative influence on the electric properties. According to Comparative Example 6, the ash content and the viscosity are comparable to Example 1, but the maximum elongation at break of Comparative Example 6 is much lower than that of Example 1 (about a half of the result obtained in Example 1).

By using a slurry composition comprising a dispersant having a specific structure and a ceramic starting material powder as in Example 1, superior dispersibility of the ceramic starting material powder can be obtained and negative influence on the electric properties of the final product can be avoided. Also, high sheet strength of the ceramic green sheet can be achieved, and ceramic green sheets with superior handleability necessary in the production process of stacked ceramic components can be obtained. Furthermore, the dispersant will not remain as an ash content.

The aforementioned effects of Example 1 are not limited to the embodiment shown as Example 1. For example, superior effects equivalent to those of Example 1 can also be obtained when using the slurry composition as an inner electrode paste or a pretreatment agent by changing the components other than the dispersant and the amounts thereof.

In other words, dispersibility of the ceramic starting material powder in the slurry composition can be improved by using the slurry composition of the present invention as an inner electrode paste for producing an inner electrode. As a result, negative influence on the dielectric layer can be avoided at the time of stacking the ceramic green sheets printed with the inner electrode paste, and negative influence on the electrical properties of stacked ceramic capacitors and initial failure thereof can be prevented thereby. Also, superior sintering delay effect of the metal powder at the time of calcination can be maintained, and structural defects and the like after calcination can be prevented. Stacked ceramic components having higher performance can therefore be obtained.

In addition, since the powder has superior dispersibility, long-term stable storage is possible when using the slurry composition of the present invention as a pretreatment agent. Furthermore, easy dispersibility can be enhanced and the production lead time and process costs can be reduced when using the pretreatment agent in a later step.

EXPLANATION OF THE NUMBERS IN THE FIGURES

1. Ceramic starting material powder
2. Solvent
3. Slurry composition
4. Carrier film
5. Ceramic green sheet
6. Metal powder
7. Inner electrode paste
8. Stacked product
9. Inner electrode layer
10. Ceramic layer
11. Direction of stacking
12. Outer electrode

The invention claimed is:

1. A slurry composition, comprising:
an inorganic powder;
a dispersant; and
a solvent,
wherein the dispersant comprises a block copolymer comprising at least one hydrophobic block A and at least one hydrophilic block B, and wherein the blocks A and B comprise repeating units represented by the following general formula I

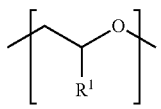

wherein $R^1$ comprises a hydrogen atom, a linear or branched alkyl group having 1 to 10 carbon atoms, a phenoxy group, and a cyclic alkyl group having 4 to 6 carbon atoms, and wherein at least one carboxylic acid group or a salt thereof is covalently linked to the block copolymer wherein the covalent link includes a carboxylic acid ester group, and wherein at least one of blocks A and B comprise the general formula (2) or (3),

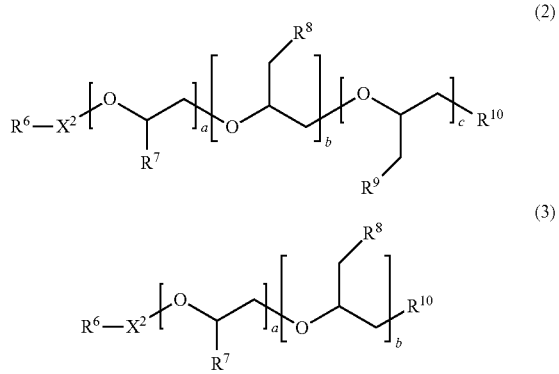

wherein in the general formulae (2) and (3),
$X^2$ is $-R^{11}-CO-$, wherein $R^{11}$ is an alkylene group having carbon atoms from 1 to 10, an alkenylene group having carbon atoms from 2 to 10, or an optionally substituted phenylene group,
$R^6$ is $-COOH$,
$R^7$, $R^8$ and $R^9$ are each independently a hydrogen atom or phenoxy group, $R^{10}$ is $-OC_nH_{2n+1}$ or $-OC_nH_{2n}-Ph$, wherein n is from 1 to 10, and
a, b and c are from 1 to 10.

2. The slurry composition according to claim 1, wherein the carboxylic acid ester group comprises a monoester group of phthalic acid, a monoester group of trimellitic acid, a monoester group of maleic acid, a monoester group of hexahydrophthalic acid, a monoester group of methyl hexahydrophthalic acid, a monoester group of methyl tetrahydrophthalic acid, a monoester group of tetrahydrophthalic acid, a monoester group of himic acid, or a monoester group of succinic acid.

3. The slurry composition according to claim 1, wherein at least two carboxylic acid groups or salts thereof are covalently linked to the block copolymer, and wherein the carboxylic acid ester comprises a diester of a tetracarboxylic acid.

4. The slurry composition according to claim 1, wherein the block copolymer comprises at least one end group which is an alkyl ether.

5. The slurry composition according to claim 1, wherein $R^{11}$ comprises an alkylene group having carbon atoms from 1 to 10,
$R^{10}$ is $-OC_nH_{2n+1}$, wherein n is from 1 to 5,
a is from 1 to 10, and
b and c are from 1 to 5.

6. The slurry composition according to claim 1, wherein the inorganic powder is a ceramic powder or metal powder.

7. The slurry composition according to claim 1, wherein the solvent comprises at least one of toluene, ethanol, methylethylketon, dihydroterpineol, dihydroterpineol acetate, and water.

8. The slurry composition according to according to claim 1, further comprising a binder resin.

9. The slurry composition according to claim 8, wherein the inorganic powder comprises at least one of barium titanate, nickel, and silver, and
the binder resin comprises polyvinyl butyral resin, ethyl cellulose, acrylic resin, or a mixture thereof.

10. The slurry composition according to claim 1, wherein carboxylic acid groups of the dispersant have been converted to ammonium salts by reaction with ammonia or an organic amine or tetraalkylammonium hydroxide.

11. A process for producing a stacked ceramic component, comprising:
repeating the following steps (1) to (3) to form a plurality of ceramic green sheets;
(1) applying a slurry composition on a carrier film, wherein an inorganic powder includes a ceramic powder,
(2) drying the slurry composition to form a ceramic green sheet on the carrier film, and
(3) removing the carrier film from the ceramic green sheet, and thereafter
stacking the ceramic green sheets obtained; and
calcining the stacked ceramic green sheets,
the slurry composition comprising:
the inorganic powder;
a dispersant; and
a solvent,
wherein the dispersant comprises a block copolymer comprising at least one hydrophobic block A and at least one hydrophilic block B, and wherein the blocks A and B comprise repeating units represented by the following general formula I

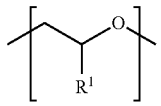

wherein $R^1$ comprises a hydrogen atom, a linear or branched alkyl group having 1 to 10 carbon atoms, a phenoxy group, and a cyclic alkyl group having 4 to 6 carbon atoms, and wherein at least one carboxylic acid group or a salt thereof is covalently linked to the block copolymer wherein the covalent link includes a carboxylic acid ester group, and wherein the dispersant comprises at least one of the general formula (2) and (3),

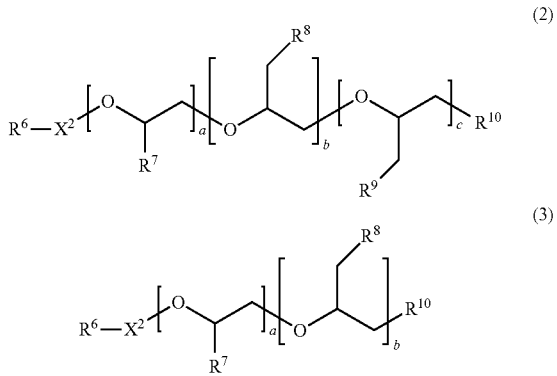

wherein in the general formulae (2) and (3),
$X^2$ is $-R^{11}-CO-$, wherein $R^{11}$ is an alkylene group having carbon atoms from 1 to 10, an alkenylene group having carbon atoms from 2 to 10, or an optionally substituted phenylene group,
$R^6$ is $-COOH$,
$R^7$, $R^8$ and $R^9$ are each independently a hydrogen atom or phenoxy group,
$R^{10}$ is $-OC_nH_{2n+1}$ or $-OC_nH_{2n}-Ph$, wherein n is from 1 to 10, and
a, b and c are from 1 to 10.

12. The process for producing a stacked ceramic component according to claim 11, wherein the stacked ceramic component is a stacked ceramic capacitor.

13. The process according to claim 11, wherein the carboxylic acid ester group comprises a monoester group of phthalic acid, a monoester group of trimellitic acid, a monoester group of maleic acid, a monoester group of hexahydrophthalic acid, a monoester group of methyl hexahydrophthalic acid, a monoester group of methyl tetrahydrophthalic acid, a monoester group of tetrahydrophthalic acid, a monoester group of himic acid, or a monoester group of succinic acid.

14. The process according to claim 11, wherein at least two carboxylic acid groups or salts thereof are covalently linked to the block copolymer, and wherein the carboxylic acid ester comprises a diester of a tetracarboxylic acid.

15. The process according to claim 11, wherein the block copolymer comprises at least one end group which is an alkyl ether.

16. The process according to claim 11, wherein, wherein $R^{11}$ comprises an alkylene group having carbon atoms from 1 to 10,
$R^{10}$ is $-OC_nH_{2n+1}$, wherein
n is from 1 to 5,
a is from 1 to 10, and
b and c are from 1 to 5.

17. The process according to claim 11, wherein the inorganic powder also includes metal powder.

18. The process according to claim 11, wherein the solvent comprises at least one of toluene, ethanol, methylethylketon, dihydroterpineol, dihydroterpineol acetate, and water.

19. The process according to claim 11, the slurry composition further comprising a binder resin.

20. The process according to claim 19, wherein the inorganic powder comprises barium titanate and comprises nickel or silver, and
the binder resin comprises polyvinyl butyral resin, ethyl cellulose, acrylic resin, or a mixture thereof.

* * * * *